United States Patent [19]

Hindermann et al.

[11] 4,111,966
[45] Sep. 5, 1978

[54] 1,5-DIHYDROXY-4,8-DIAMINO-ANTHRAQUINONE COMPOUNDS ARYLATED IN 3-POSITION

[75] Inventors: Peter Hindermann, Bottmingen, Switzerland; Jean-Marie Adam, Saint-Louis, France; Urs Karlen, Magden, Switzerland

[73] Assignee: Ciba-Geigy Corporation, Ardsley, N.Y.

[21] Appl. No.: 749,201

[22] Filed: Dec. 9, 1976

[30] Foreign Application Priority Data

Dec. 23, 1975 [CH] Switzerland .................. 16695/75

[51] Int. Cl.² ................... C07C 49/68; C09B 1/12
[52] U.S. Cl. ...................... 260/373; 260/380
[58] Field of Search ...................... 260/373, 380

[56] References Cited

U.S. PATENT DOCUMENTS

| 1,782,747 | 11/1930 | Schmidt ...................... 260/373 |
| 3,636,006 | 1/1972 | Gye-Vuilleme et al. ........ 260/380 X |
| 4,014,906 | 3/1977 | Karlen et al. ................ 260/373 |

FOREIGN PATENT DOCUMENTS 627,010  7/1963  Belgium ............................ 260/380

OTHER PUBLICATIONS

Clark et al., "On the Mechanism of the Acid-Catalysed Arylation of Anthraquinones," in S. Appl. Chem. Biotechnol., 1974, 24, 343–348.

Buecheler et al., "Anthraquinones" in Chem. Abs., vol. 78, 1973, p. 70.

*Primary Examiner*—Allen B. Curtis
*Attorney, Agent, or Firm*—Edward McC. Roberts; Prabodh I. Almaula

[57] ABSTRACT

1,5-dihydroxy-4,8-diaminoanthraquinone compounds of the formula I

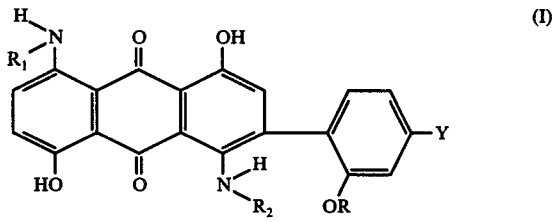

wherein
Y represents a linear or branched alkyl group of 1 to 5 carbon atoms,
R represents a hydrogen atom, an unsubstituted or substituted alkyl group of 1 to 5 carbon atoms or the cyclohexyl group, and
each of $R_1$ and $R_2$ independently represents a hydrogen atom, the methyl, ethyl or iso-propyl group.

6 Claims, No Drawings

1,5-DIHYDROXY-4,8-DIAMINO-ANTHRAQUINONE COMPOUNDS ARYLATED IN 3-POSITION

The invention provides a process for the manufacture of 1,5-dihydroxy-4,8-diaminoanthraquinone compounds which are arylated in 3-position, the compounds and intermediates themselves and the use thereof for dyeing or printing textile material, in particular polyester material.

German patent specifications Nos. 445,269, 446,563 and 456,235 disclose processes for the manufacture of 1,5-dihydroxy-4,8-diaminoanthraquinone compounds which are arylated in 2-position, wherein 1,5-dihydroxy-4,8-diaminoanthraquinone-2,6-disulphonic acid is reacted in the presence of boric acid in concentrated sulphuric acid with phenols, naphthols or anisoles to yield addition products which, when they are subsequently treated with acids or alkalies with attendant exchange of the sulphonic acid group in 2-position, are converted into the corresponding aryl-substituted compounds, and wherein the sulphonic acid group in 6-position can also be subsequently removed by reduction. Analogous reactions with thiophene and derivatives thereof are disclosed in German patent specification No. 1,184,878, and with chromane and similar compounds in German patent specification No. 1,278,639 and in DT-OS 1,644,514. This reaction, viz. the arylation in ortho-position to the OH group of a 1,5-dihydroxy-4,8-diaminoanthraquinone compound, is known as the "R. E. Schmidt reaction" and is also described, for example, in "The Chemistry of Synthetic Dyes" by K. Venkataraman, Vol. III, 1970, page 407, and in "Chemie der organischen Farbstoffe" by Fritz Mayer, Vol. I, 1934, page 174.

The use of such ortho-substituted 1,5-dihydroxy-4,8-diaminoanthraquinone derivatives for dyeing polyamide fibres, cellulose esters and polyterephthalate fibres is also known from German patent specification No. 1,144,678 and U.S. Pat. No. 3,265,460.

A radical change in the formulation of this R. E. Schmidt reaction came about through the publications of E. D. Pandhare, V. B. Patil, A. V. Rama Rao and K. Venkataraman in the "Indian Journal of Chemistry", Vol. 9 (1971), pp. 1060–1063, and of M. C. Clark, T. J. Marley and P. A. Lowe in the "J. appl. Chem. Biotechnol.", 1974, 24, pp. 343–348. With the aid of $^1$H-NMR spectroscopy, these authors were able to prove conclusively that the arylation takes place in 3-position, viz. in the ortho-position to the $NH_2$ group of the 1,4-dihydroxy-4,8-diaminoanthraquinone and not in the ortho position to the OH group.

Such a reaction, which results in 1,5-dihydroxy-4,8-diaminoanthraquinone compounds, is also known from DT-OS No. 2,346,047.

It has now been found that the arylation of 1,5-dihydroxy-4,8-diaminoanthraquinone-2-sulphonic acid or 1,5-dihydroxy-4,8-diaminoanthraquinone-2,6-disulphonic acid with phenols and phenol ethers which are substituted in the meta-position, under conditions of the known R. E. Schmidt reaction, accompanied by the elimination of the sulphonic acid group in 2-position, results surprisingly and unexpectedly in novel mono- and disulphonic acids one sulphonic acid group of which is in the phenol radical and can only be hydrolysed under specific conditions, whereas the other sulpho group of the disulphonic acids is in the 6-position of the anthraquinone radical and can be reduced with alkali, by which means novel disperse anthraquinone compounds are obtained, which are arylated in 3-position and wherein, surprisingly, the oxygen atom of the phenol derivative is also in the ortho-position to the C—C linkage of the phenol radical at the anthraquinone radical. This reaction, and the formation of an isolatable disulphonic acid as intermediate, is novel, and, in the light of the known R. E. Schmidt reaction, was unexpected.

By means of a simple synthesis, the novel process thus makes it possible to obtain blue disperse dyes which, compared with comparable known dyes, have improved fastness properties, in particular fastness to sublimation and washing, on for example polyester material. The dyes of the present invention are also characterised by very good migration characteristics.

The process of the present invention for obtaining 1,5-dihydroxy-4,8-diaminoanthraquinone compounds of the formula I, the reaction course of which is clearly evident from the reaction schemes II and III, thus comprises the addition of an anthraquinone compound of the formula II

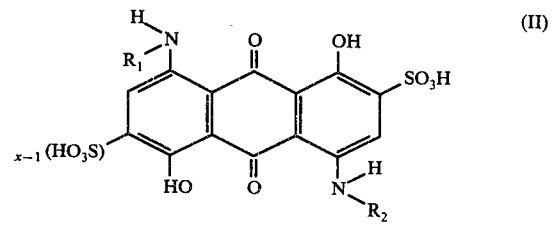

wherein $x$ is 1 or 2, in the presence of ortho-boric acid and concentrated sulphuric acid (96 to 100%), to a compound of the formula III, at a temperature of $-15°$ to $+50°$ C., in particular of 0° to 10° C., to give the leuco form of the compound of the formula IVa

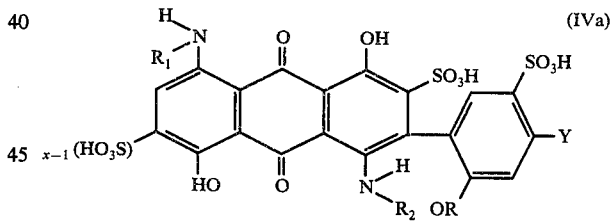

which then, upon dilution with water and in a temperature range between 80° and 100° C. with attendant removal of the sulpho group in 2-position, is reacted to give a compound of the formula IV and of the formula VI, and converting these two compounds into the compound of the formula I. The conversion of the compound of the formula VI into the compound of the formula I is effected with an inorganic strong acid at a temperature of approx. 100° to 120° C. There are two ways in which the compound of the formula IV is converted into the compound of the formula I, viz. on the one hand hydrolysing the sulpho group present in the aryl group in 3-position with an inorganic strong acid to give a monosulphonic acid of the formula V, and then reducing this compound with alkali to give the compound of the formula I, or conversely by reducing the compound of the formula IV with alkali to give the monosulphonic acid of the formula VI and then hydrolysing this compound with a strong inorganic acid to give the compound of the formula I.

Examples of strong inorganic acids are hydrochloric and ortho-phosphoric acid. However, particularly good results are obtained with concentrated sulphuric acid, in particular with a 40 to 70%, preferably 55 to 60%, aqueous sulphuric acid.

The alkaline reduction is carried out in known manner, for example with sodium hydrosulphite in ammoniacal medium or in the presence of sodium hydroxide. However, it is also possible to carry out the reduction with glucose in alkaline medium.

The following scheme will serve to illustrate the reaction course:

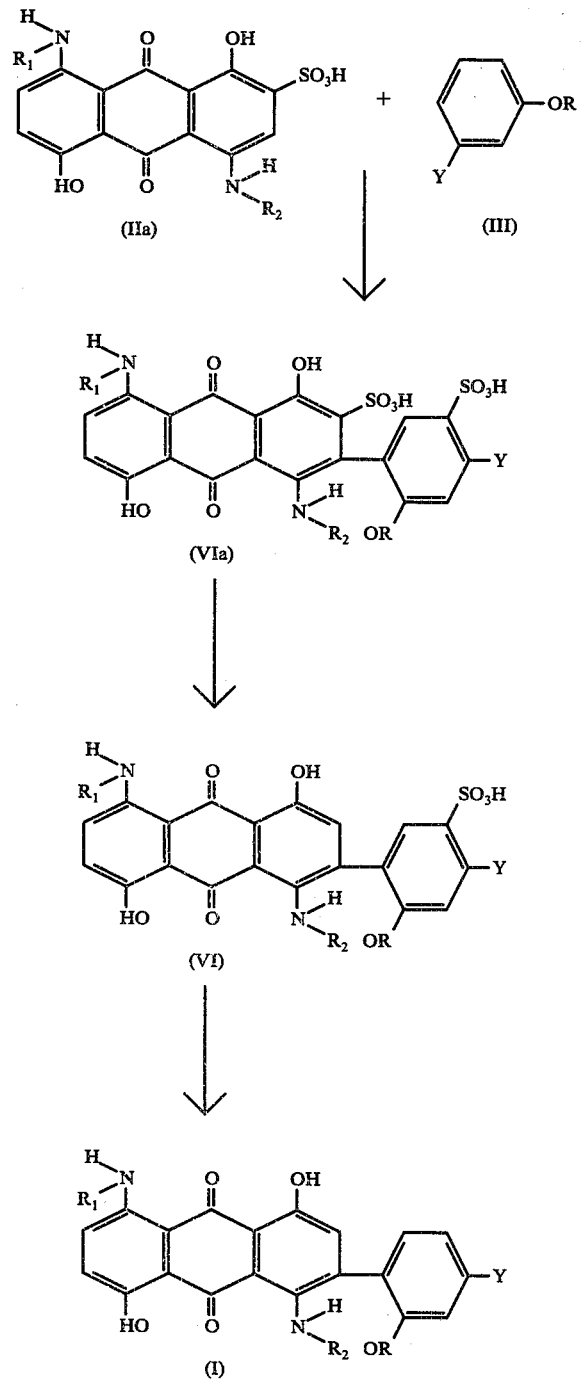

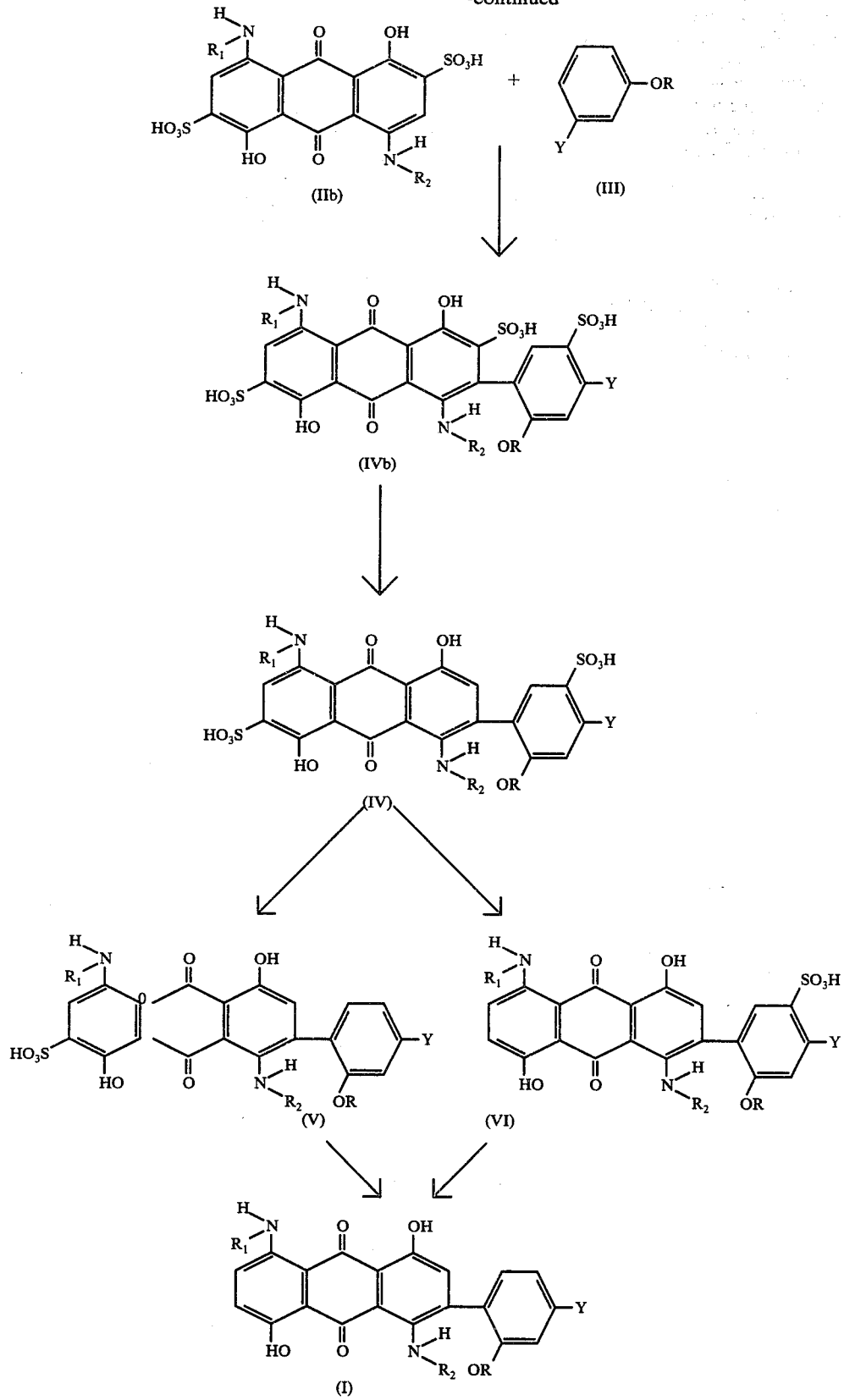
In the formulae I to VI, the symbols have the following meanings:
Y represents a linear or branched alkyl group of 1 to 5 carbon atoms,
R represents a hydrogen atom, an unsunstituted or substituted alkyl group of 1 to 5 carbon atoms, or the cyclohexyl group, and each of $R_1$ and $R_2$ independently represents a hydrogen atom, the methyl, ethyl or iso-propyl group.

A linear or branched alkyl group of 1 to 5 carbon atoms is for example the methyl group, the ethyl group, the n-propyl and iso-propyl group, the n-butyl, sec.-butyl or tert.-butyl group or the pentyl group.

R can represent an unsubstituted alkyl group in accordance with the definition of Y. However, this alkyl group can be substituted for example by CN, OH or $C_1$-$C_4$-alkoxy groups, or R is a radical of the formula A-Z, wherein A represents a —$(CH_2)_n$— or a —$(CH_2)_2$—O—$(CH_2)_2$— group in which $n$ is 2 to 8 and Z represents a CN or COOH group.

In preferred compounds, Y represents the methyl group, R represents a hydrogen atom and $x$ is 2 (= compound IIb).

In the above reaction sequence, traces of an isomeric by-product of the formula

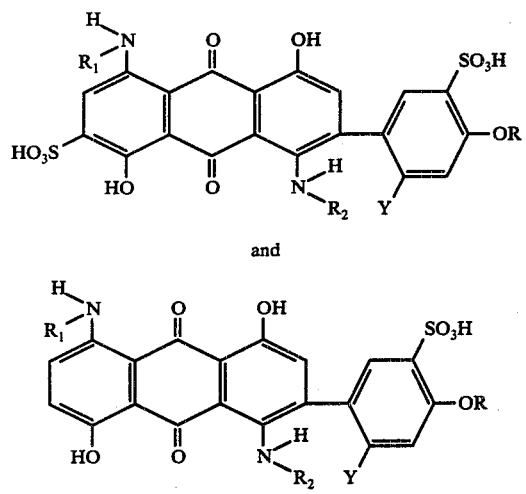

and are obtained in the reaction of the compound IIa or IIb with the compound III to give the compound IV and VI. On the other hand, the reaction of the compound IIb with the compound III to give the compound IV yields a further by-product of the formula Va

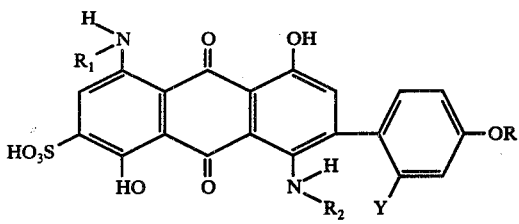

which is simultaneously reduced with alkali to give the isomeric compound of the formula Ia

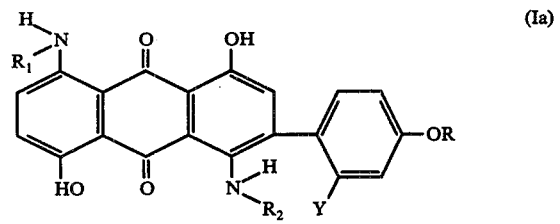

so that the intermediate of the formula IV still contains approx. 5% of a by-product of the formula Va, and a mixture of dyes of the formulae I and Ia, in the approximate ratio of 95:5, is present in the end product of the formula I.

The compounds of the formulae II and III are known. For example, those of the formula II, wherein $x$ is 2 (formula IIb), are obtained on the lines of the method described by J. Houben in "Die Anthracene und die Anthraquinone", G. Thieme Verlag, Leipzig, 1929, pp. 447–448, or of the method of DT-OS No. 2,231,514, or of that of Swiss patent application No. 17034/74. The compounds of the formula II, wherein $x$ is 1 (formula IIa), are obtained by the desulphonation of 1,5-dihydroxy-4,8-diaminoanthraquinone-2,6-disulphonic acid to give 1,5-dihydroxy-4,8-diaminoanthraquinone-2-sulphonic acid in accordance with the particulars in Friedlander, Vol. 19, page 2001 (1934) or Vol. 21, page 1038 (1937).

The compounds of the formulae I, IV, V and VI and their above mentioned mixtures with isomers are novel and their constitution has been conclusively proved by proton NMR and $^{13}$C-NMR spectra. The compounds of the formulae IV, IVa and VI are acid compounds in the form of intermediates, whilst the compound of the formula I is a disperse compound.

The intermediates of the formulae IV, IVa, V and VI are used on the one hand for obtaining disperse dyes and on the other for dyeing and printing organic material, in particular textile material, which can be dyed with acid dyes, for example natural polyamide, such as wool and silk, and synthetic polyamide.

The novel compounds of the formula I which can be obtained according to the invention, and their isomeric mixtures, are blue dyes which, by themselves, or preferably in the form of aqueous suspensions, are suitable chiefly for dyeing and printing synthetic and regenerated man-made fibres, for example for dyeing and printing cellulose esters, cellulose triacetate, synthetic polyamide, polyurethane, and, in particular, linear polyester fibres, chiefly polyethylene terephthalate fibres. In the exhaustion and continuous processes, dyeings of good to very good fastness properties, such as fastness to light, sublimation, thermofixing and wet treatments, are obtained on these materials. The textiles can be in any form of make-up, for example fibres or wovens.

The invention is illustrated by the following non-limitative Examples, in which the parts are by weight.

EXAMPLE 1

21.5 Parts of 1,5-dihydroxy-4,8-diaminoanthraquinone-2,6-disulphonic acid are added at 45° C. to a solution of 21.6 parts of ortho-boric acid in 400 parts of 96% sulphuric acid. After the starting material has dissolved, the mixture is cooled to 5°–8° C. and at this temperature 13 parts of m-cresol are added in the course of 15 minutes and the batch is stirred for 3 hours at the same temperature.

Thereafter the reaction mass is poured into 100 parts of ice-water and the mixture is heated for 2 hours to the boil. The precipitate which has formed is collected with suction and the filter residue is washed with a 10% aqueous solution of sodium chloride. The filter cake is suspended in 750 parts of water of 80° C. and the suspension is neutralised with sodium hydroxide. The sodium salt of the dye is precipitated by adding sodium chloride, collected with suction, washed with 125 parts of a 10% aqueous solution of sodium chloride and dried to yield a mixture in the ratio of approx. 95:5 of a disulphonic acid of the formula

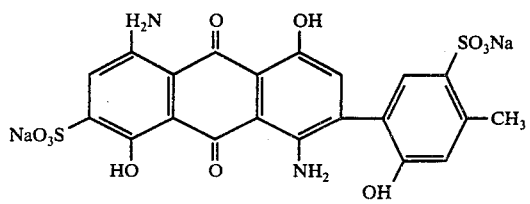

and of a monosulphonic acid of the formula

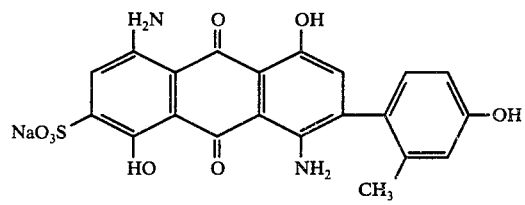

This mixture is stirred in 1000 parts of a 60% solution of sulphuric acid of 110° C. for 3 hours. After it has cooled, the reaction mixture, which contains both the following monosulphonic acids

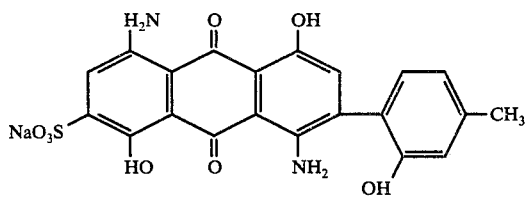

and

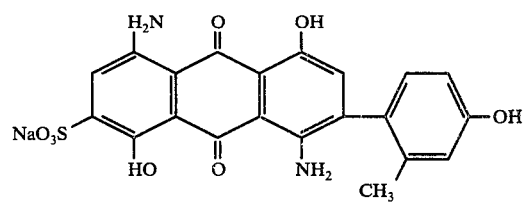

in the ratio of approx. 95:5, is poured into 1000 parts of ice-water. The precipitate is collected with suction, washed neutral with water and, without further drying, immediately added to 750 parts of water and the pH is adjusted to 7 with sodium hydroxide solution. After addition of 40 parts of a 25% solution of ammonia, the reaction mixture is heated to 90°–92° C. and 300 parts of a 10% aqueous solution of sodium hydrosulphite is added thereto in the course of 1 hour. The precipitate which forms is collected with suction, washed neutral with water, and dried. The reaction mixture contains approx. 95% of the dye of the formula

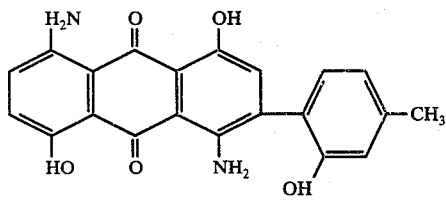

and approx. 5% of the dye of the formula

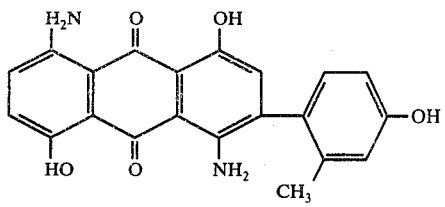

and yields on fibrous material made of linear polyesters strong, reddish blue dyeings which are fast to light and thermofixing.

The 1,5-dihydroxy-4,8-diaminoanthraquinone-2,6-disulphonic acid used as starting material can be prepared, for example, by a process comprising carrying out two reaction steps consecutively in the same reaction vessel starting from 1,5-dihydroxy-anthraquinone in accordance with the particulars of DT-OS No. 2,231,514, or starting from 1,5-dimethoxy-anthraquinone in accordance with Swiss patent application No. 17034/74 by sulphonation and amidation with hydroxylaminesulphate in the presence of vanadium pentoxide as catalyst in sulphuric acid. The arylation with m-cresol can then be carried out without isolating the 1,5-dihydroxy-4,8-diaminoanthraquinone-2,6-disulphonic acid.

Preparation Of The Pure Dye Components

Separation of the disulphonic acid and the monosulphonic acid obtained in Example 1 by crystallisation from pyridine/water yields — after removal of the sulpho groups as indicated in Example 1 — the pure dyes whose $^1$H-NMR and $^{13}$C-NMR spectra are absolutely in accord with the following formulae:

| | |
|---|---|
| (structure 1) | m.p. 307° C (recrystallised from nitrobenzene) |
| (structure 2) | m.p. 302° – 303° C (recrystallised from nitrobenzene) |

A mechanical mixture in the ratio 50:50 of both isomers gives a lowering of the melting point of approx. 30° C.

EXAMPLE 2

21.5 Parts of 1,5-dihydroxy-4,8-diaminoanthraquinone-2,6-disulphonic acid are dissolved at 45° C. in a solution of 21.6 parts of ortho-boric acid in 400 parts of 96% sulphuric acid. After the mixture has cooled to 5°–8° C., 14.6 parts of m-cresol methyl ether are added dropwise. The reaction mixture is stirred for 3 hours at 5°–8° C., then poured into 1000 parts of ice-water and heated for 2 hours to the boil. After the batch has cooled, the precipitate is collected with suction and washed neutral with a 10% solution of sodium chloride. The filter residue contains a mixture composed of approx. 95% of the disulphonic acid of the formula

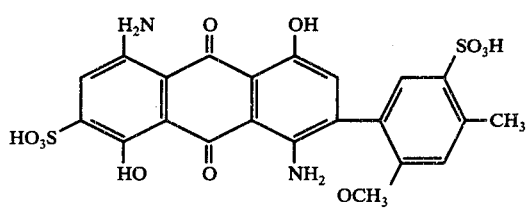

and approx. 5% of the monosulphonic acid of the formula

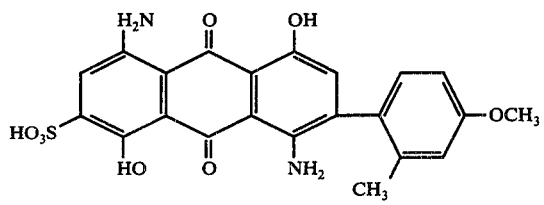

Without being dried, this mixture is stirred in 750 parts of water, neutralised with sodium hydroxide solution and, after addition of 40 parts of a 25% aqueous solution of ammonia, heated to 90°–92° C. and reduced in the course of 1 hour with 300 parts of a 10% solution of hydrosulphite. The precipitate is collected with suction, washed neutral with water, and dried. The reaction mixture contains approx. 95% of the monosulphonic acid of the formula

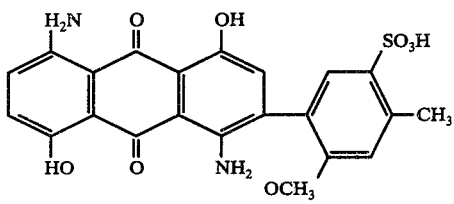

and approx. 5% of the dye of the formula

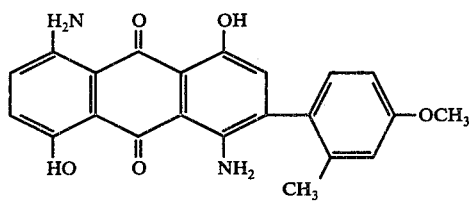

This crude mixture is stirred in 1000 parts of a 60% solution of sulphuric acid of 110° C. for 3 hours. After cooling, the precipitate is poured into 1000 parts of ice-water, collected with suction, washed free of acid with water and dried. A blue powder which contains the following two dyes:

approx. 95% of

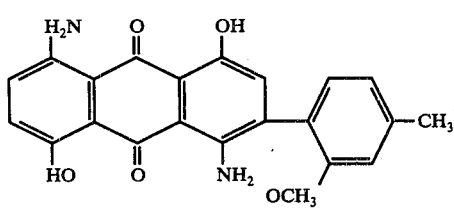

-continued
and approx. 5% of

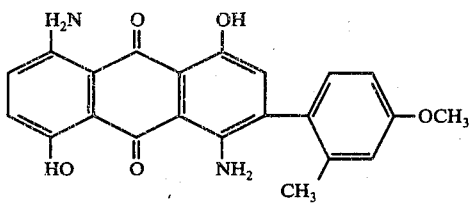

is obtained in very good yield.

From a finely divided aqueous dispersion, this dye mixture exhausts in reddish blue shades onto fibres and wovens of polyethylene terephthalate and cellulose triacetate. The dyes have very good wet- and lightfastness. Similar blue dyes with good tinctorial properties are obtained by using 16.3 parts of 3-ethylanisole or 16.3 parts of m-cresol ethyl ether or 22.8 parts of m-cresol cyclohexyl ether instead of 14.6 parts of m-cresol methyl ether.

EXAMPLE 3

1 Part of the mixture of disperse dyes obtained in Example 1 and 2 is ground wet with 2 parts of a 50% aqueous solution of the sodium salt of diphenylmethanedisulphonic acid and dried.

This dye preparation is stirred with 40 parts of a 10% aqueous solution of the sodium salt of N-benzyl-μ-heptadecyl-benzimidazole-disulphonic acid and 4 parts of a 40% solution of acetic acid are added. A dyebath of 4000 parts is prepared therefrom by dilution with water.

100 Parts of a cleansed polyester fabric is put into this bath at 50° C., the temperature is raised in the course of half an hour to 120°–130° C. and dyeing is carried out for 1 hour in a closed vessel at this temperature. The fabric is subsequently thoroughly rinsed. A strong, reddish blue dyeing of excellent fastness to light, sublimation and thermofixing is obtained.

We claim:

1. Anthraquinone compounds of the formula IV

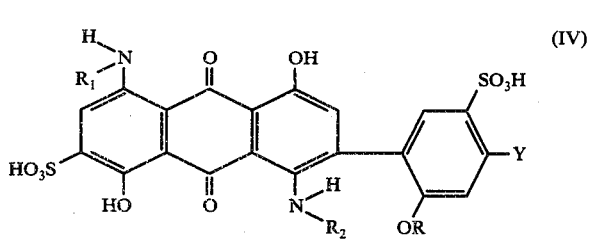

wherein

Y represents a linear or branched alkyl group of 1 to 5 carbon atoms,

R represents a hydrogen atom, an unsubstituted or substituted alkyl group of 1 to 5 carbon atoms or the cyclohexyl group, and each of $R_1$ and $R_2$ independently represents a hydrogen atom, the methyl, ethyl or iso-propyl group.

2. An anthraquinone compound according to claim 1, wherein R represents a hydrogen atom or the methyl group, each of $R_1$ and $R_2$ represents a hydrogen atom and Y represents the methyl group.

3. The anthraquinone compound of the formula V

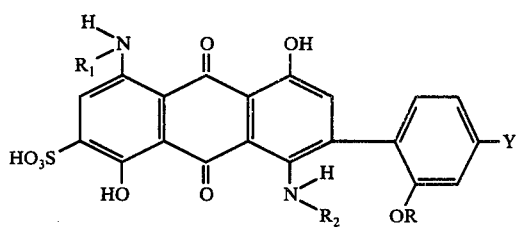 (V)

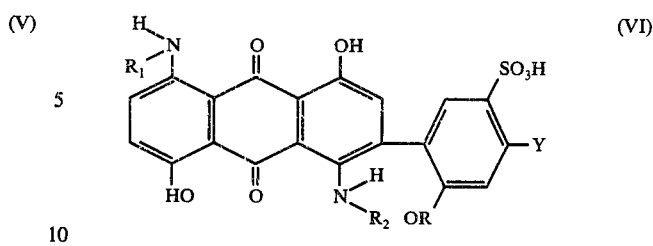 (VI)

wherein
- Y represents a linear or branched alkyl group of 1 to 5 carbon atoms,
- R represents a hydrogen atom, an unsubstituted or substituted alkyl group of 1 to 5 carbon atoms or the cyclohexyl group, and each of
- $R_1$ and $R_2$ independently represents a hydrogen atom, the methyl, ethyl or iso-propyl group.

4. An anthraquinone compound according to claim 3, wherein R represents a hydrogen atom or the methyl group, each of $R_1$ and $R_2$ represents a hydrogen atom and Y represents a methyl group.

5. The anthraquinone compound of the formula VI wherein
- Y represents a linear or branched alkyl group of 1 to 5 carbon atoms,
- R represents a hydrogen atom, an unsubstituted or substituted alkyl group of 1 to 5 carbon atoms or the cyclohexyl group, and each of
- $R_1$ and $R_2$ independently represents a hydrogen atom, the methyl, ethyl or iso-propyl group.

6. An anthraquinone compound according to claim 5, wherein R represents a hydrogen atom or the methyl group, each of $R_1$ and $R_2$ represents a hydrogen atom and Y represents the methyl group.

* * * * *